(12) United States Patent  
Gitzinger et al.

(10) Patent No.: US 12,398,885 B2
(45) Date of Patent: Aug. 26, 2025

(54) SAFE START-UP OF A COOLED RADIANT TUBE BURNER AT HIGH TEMPERATURE OPERATION

(71) Applicant: Honeywell International Inc., Charlotte, NC (US)

(72) Inventors: Heinz-Peter Gitzinger, Neuss (DE); Thomas Huning, Hagen a. T.W. (DE); Martin Knostmann, Ostercoppeln (DE)

(73) Assignee: Honeywell International Inc., Charlotte, NC (US)

( * ) Notice: Subject to any disclaimer, the term of this patent is extended or adjusted under 35 U.S.C. 154(b) by 588 days.

(21) Appl. No.: 17/521,441

(22) Filed: Nov. 8, 2021

(65) Prior Publication Data

US 2023/0143249 A1 May 11, 2023

(51) Int. Cl.
*F23N 5/24* (2006.01)

(52) U.S. Cl.
CPC .......... *F23N 5/245* (2013.01); *F23N 2225/16* (2020.01); *F23N 2227/02* (2020.01); *F23N 2231/12* (2020.01)

(58) Field of Classification Search
CPC .. F23N 5/245; F23N 2225/16; F23N 2231/12; F23N 2227/02
(Continued)

(56) References Cited

U.S. PATENT DOCUMENTS 10,378,765 B2  8/2019  Stewart et al.
2013/0157204 A1  6/2013  Hong et al.
(Continued)

FOREIGN PATENT DOCUMENTS

DE  10217524 B1  11/2003
EP  0463218 A1  11/1994
(Continued)

OTHER PUBLICATIONS

2020.*
European Search Report for corresponding EP Application No. 22202500.9 dated Apr. 14, 2023.

*Primary Examiner* — Avinash A Savani
(74) *Attorney, Agent, or Firm* — Paschall & Associates, LLC; Mark Goldberg; Anthony Miologos

(57) ABSTRACT

A furnace heating device is provided for the heating a furnace chamber, comprising:
at least one radiant tube, configured to heat the furnace chamber and which can be heated using a burner, which can be operated in a first operating mode with a flame and in a second operating mode with flameless combustion, a burner control device, configured to control on and off states and operating mode setting for the burner of the radiant tube, wherein said burner control device is configured to determine when a temperature (T) of the furnace chamber lies above a critical temperature ($T_k$), which must at least be present in a combustion chamber for safe operation of flameless combustion, wherein there is a single safety monitor for monitoring the temperature within said furnace chamber and communicating said temperature to said burner control device and wherein said burner control device is configured to send a signal to not send a signal to start said flameless combustion when it is determined that said temperature (T) of the furnace chamber is above the critical temperature and a cooling process or a purging process or a control device switch on procedure has occurred.

5 Claims, 3 Drawing Sheets

(58) Field of Classification Search
USPC .......................................................... 431/15
See application file for complete search history.

(56) References Cited

U.S. PATENT DOCUMENTS

| | | | |
|---|---|---|---|
| 2013/0260323 A1* | 10/2013 | Hong | ........................ F23N 5/00 |
| | | | 431/14 |
| 2017/0254536 A1 | 9/2017 | Super et al. | |
| 2019/0120483 A1 | 4/2019 | Wünning et al. | |
| 2019/0203930 A1* | 7/2019 | Wünning | ................... F23C 7/06 |
| 2019/0376688 A1 | 12/2019 | Young et al. | |

FOREIGN PATENT DOCUMENTS

| | | | |
|---|---|---|---|
| EP | 1995515 B1 | | 5/2007 |
| JP | 2020112332 A | * | 7/2020 |
| WO | 2020253970 A1 | | 12/2020 |

* cited by examiner

SAFE START-UP OF A COOLED RADIANT TUBE BURNER AT HIGH TEMPERATURE OPERATION

The invention relates to a furnace heating device and a method for igniting burners designed for flameless oxidation in order to heat intermittently operated radiant tubes.

EP 0 463 218 A1 discloses the operation of burners with flameless oxidation. This operation is based on injecting a fuel and pre-heated air at high speed into a waste gas recirculation eddy. A burner is used to heat the combustion chamber and is operated with a flame. Once the operating temperature has been reached, it is possible to switch over to flameless oxidation.

Furthermore, DE 102 17 524 B4 discloses the heating of radiant tubes by means of burners which operate with flameless oxidation. Burners of this kind are also designed to assume an operating mode with flame in the heating phase.

EP 1 995 515 B1 discloses a burner for heating furnace chambers by means of flameless oxidation, in which the operating temperature is below a limit temperature necessary for the flameless oxidation. To this end, hot gases are generated by means of a steadily burning flame and are used to assist and maintain the otherwise flameless oxidation.

US20190120483A1 discloses a method of heating a furnace using radiant tubes with flameless operation below oven temperature of 850° C. and flameless operation with furnace temperature monitoring by means of two safety temperature monitors for two temperature limits such as 770° C. and 850° C. This method extends the temperature range for flameless operation to temperatures below 850° C. such as above 770° C. instead of only above 850° C.

Radiant tubes are typically used for indirect heating of industrial furnaces for temperatures up to approximately 1200° C. In order to dissipate radiant heat, the radiant tubes are heated from the inside, wherein the radiant tube can be heated by flameless oxidation, which significantly reduces the nitrogen oxides in the waste gas.

If the temperature of the industrial high temperature application is controlled by switching individual radiant tubes or entire radiant tube groups on and off, the radiant tubes must be switched on and off whilst still warm from operation. However, if the radiant tubes are heated by burners with a flame and if the process is performed with high air preheating (in particular preheating to more than 500° C.) for energy conservation reasons, the resultant nitrogen oxide values are unacceptably high. The operation of the burners with flameless oxidation by contrast leads to lower nitrogen oxide values, wherein according to experience, in the case of furnaces heated by means of radiant tube, a furnace operating temperature of at least 850° C. is necessary in order to be able to reliably put a burner into operation with flameless oxidation. If the furnace temperature is lower, however, deflagrations can occur in the event of intermittent operation, i.e. switching on and off of burners for output regulation. In this regard, furnace operating temperatures below 850° C. can be considered critical for intermittent flameless burner operation (flameless pulsed burning).

In high-temperature furnaces, which are gaining larger markets due to increasing low-emission requirements, the furnace system switches from flame monitoring to temperature monitoring at a central position after the ignition temperature has been reached. The temperature monitoring must be carried out with an approved complex fail-safe double thermocouple. In furnaces with indirect heating, i.e. the exhaust gases from the burners do not enter the furnace chamber, the central position is not the coolest position under all conditions. After a cooling mode, the temperature in each individual radiant tube can fall below the monitored furnace chamber temperature. As a consequence, a thermocouple would need to be integrated in each radiant tube to reliably monitor a temperature above a critical temperature.

SUMMARY OF THE INVENTION

A furnace heating device is provided for the heating a furnace chamber, comprising least one radiant tube, configured to heat the furnace chamber and which can be heated using a burner, which can be operated in a first operating mode with a flame and in a second operating mode with flameless combustion, a burner control device, configured to control on and off states and operating mode setting for the burner of the radiant tube, wherein there is a single safety monitor for monitoring the temperature which must at least be present in a combustion chamber for safe operation of flameless combustion within the furnace chamber and communicating said temperature to said burner control device and wherein said burner control device is configured to send a signal to start the flameless combustion when it is determined that said temperature (T) of the furnace chamber is above said critical temperature and a cooling process or a purging process or a control device switch on procedure has occurred. In the furnace heating device, the burner control device may be further configured with information on sizes of radiant tubes and burner capacity within the furnace chamber.

Another embodiment provides a method for controlling a furnace heating device comprising determining factors for when a safe start-up of a furnace containing radiant tubes may take place; sending a signal to the furnace from a burner control unit to ignite burners within said furnace when the factors indicate that a temperature within the radiant tubes is above a critical temperature. The factors may comprise a measurement of time during which a temperature within a radiant tube is expected to be above a critical temperature at which safe start-up with flameless mode of said single burners of the furnace may occur. The factors may be determined based upon a volume of a radiant tube and a capacity of a burner. The factors may determine a minimum heating time for said radiant tubes.

DETAILED DESCRIPTION

Figure 1:
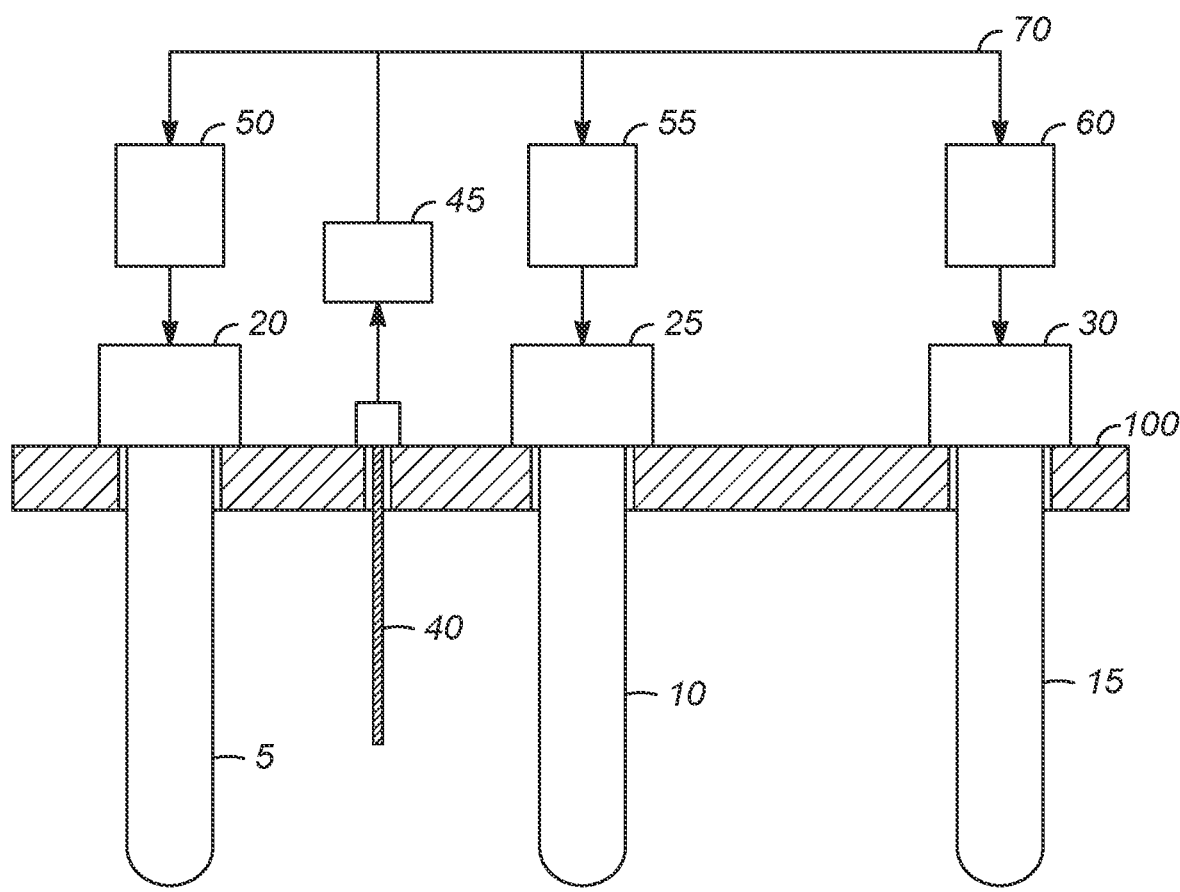
FIG. 1 shows a set of radiant tubes connected to burners with burner control units.

The core of the present disclosure is that in the start-up in central temperature monitored flameless operation the flameless mode cannot be started until the combustion zone inside of a radiant tube is first brought above a critical temperature. This causes the combustion chamber temperature in the radiant tube to rise to a safe temperature above a critical temperature. In comparison to the state of the art, the disclosure solves the safety problem described above by means of software in the fail-safe burner control. Having a temperature monitoring configuration for each individual radiant tube burner would be complex and the costs for a double thermocouple with fail-safe evaluation per burner would be prohibitive, especially with the number of burners found in a typical furnace. With this innovation there is a higher safety and at the same time a competitive advantage over existing systems. The cooling of the radiant tube interior below a critical temperature and below the furnace chamber temperature detected by the usual temperature monitoring at a central point can only be achieved by control processes, e.g. cooling or purging by the user. This control process is performed by a burner control unit. In accordance with the solution, this burner control system memorizes the process. In the case of a previously used cooling process, the start-up must not follow a high-temperature start-up afterwards, as this can lead to an explosion.

In such a situation, the temperature in the radiant tube must first be brought to a value above a critical temperature and only then may the start-up or switchover of the burner occur in high-temperature operation follow. The time needed to reach the required temperature in the radiant tube is given by the mechanical construction and can be defined depending on the size of the radiant tube and the burner capacity.

By using the burner control with the software extension, the furnace operator can use the burners for cooling and heating according to his control without any risk. In the burner control unit, the determined time for reaching the critical temperature must be parameterized. Depending on the capacity of the burner and the radiant tube volume, the time to be determined for this system must be defined.

In a simplified operation of the burner control with the software extension, the burner is started in high temperature mode. Flame operation is activated after cool down after one of the following conditions have occurred: The device was switched on, there was a purge of gases in the burner tubes or there was a cooling process. A start attempt or a restart of the burner does not cause this start-up in flame operation to be aborted. The start in flame operation is repeated until the required burning time for heating up the burner is reached.

In a typical furnace there may be 2-20 burners per zone. There may be one or two or as many as 10 zones within a furnace. In the operation of a radiant tube burner, it is desirable to control the burner without having a thermocouple on each burner tube In starting up the burner, it is in flame mode and then switched to flameless mode. The flame continues to burn in the burner tube until the temperature is high enough so that flame monitoring may be turned off.

The furnace heating device according to the invention comprises at least one radiant tube, preferably a plurality of radiant tubes, which can be heated in each case by means of a burner (at least one burner), which in a first operating mode can be operated with flame and in a second operating mode can be operated without flame, i.e. with flameless oxidation. The interior of the radiant tube is preferably sealed off with respect to the furnace chamber. At least one control device is provided, by means of which the burner or the burners of the radiant tubes can be switched on and off and can be switched over between the first and the second operating mode. The temperature of the interior of the radiant tube in the case of an active burner is greater than the temperature of the furnace chamber. During breaks in operation, which occur repeatedly in the case of pulsed burning, the temperature in the interiors of the radiant tubes approaches the furnace temperature from above.

In accordance with the invention the control device is designed to operate the burner temporarily in the first operating mode and then in the second operating mode in the event of a warm start. If the burner of the radiant tube is clocked, i.e., is operated with what is known as pulsed burning, the burner must be reliably started again and again.

The furnace heating device can comprise a device for at least local detection of the furnace temperature, for example in the form of one or more switching temperature sensors. If a temperature sensor of this kind is arranged at a point of an industrial furnace, it determines the switching on and off of burners on the basis of the furnace temperature, but not on the basis of the radiant tube temperature.

FIG. 1 shows three radiant tubes 5, 10 and 15 that are connected to burners 20, 25 and 30 that are connected with burner control units 50, 55 and 60. A sensor 40 is shown that sends data including temperature data to a control unit 45 that is configured to communicate through line 70 to each of burner control units 50, 55 and 60.

Figure 2:
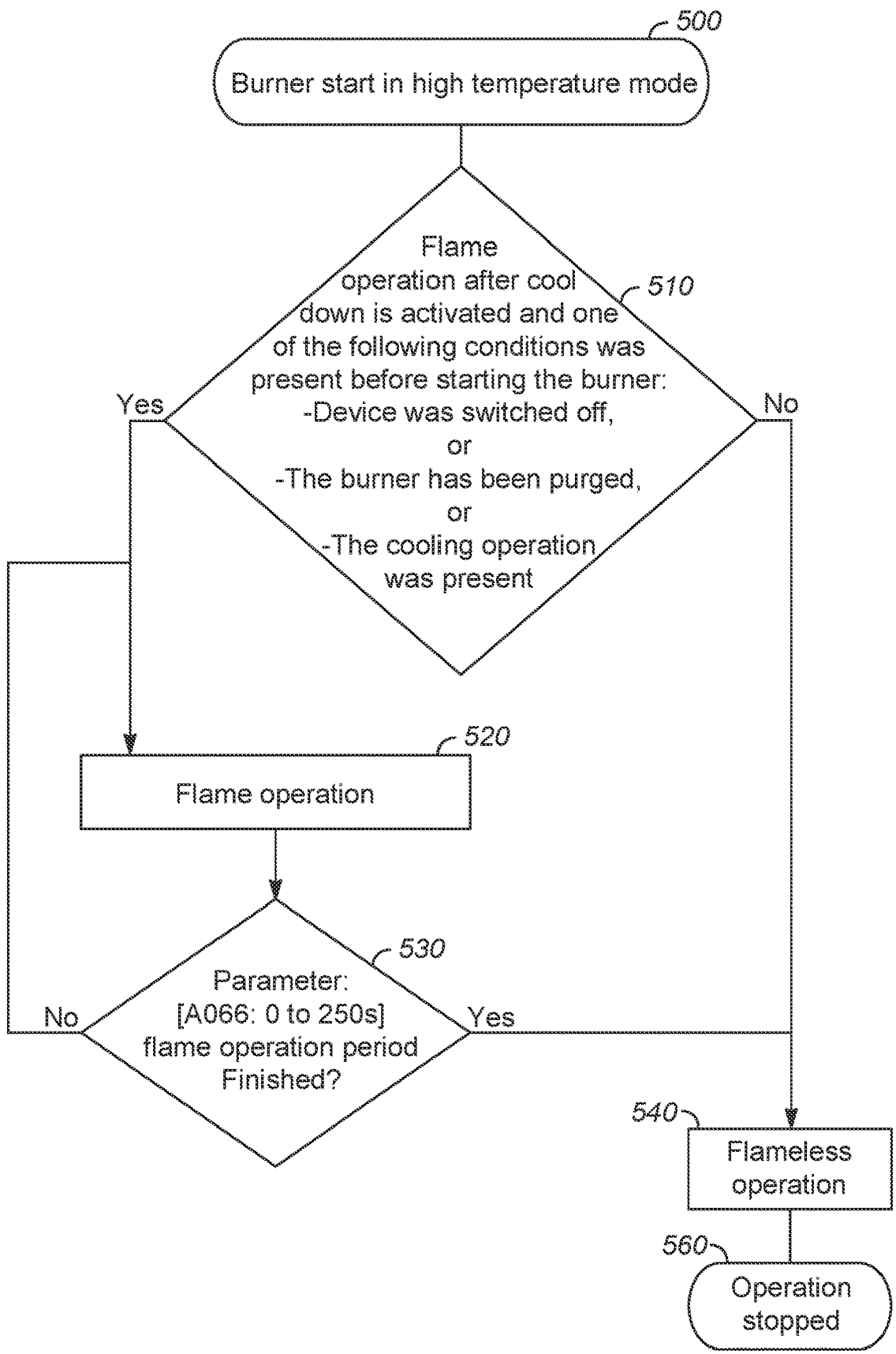
FIG. 2 shows a flow scheme of the burner operation.

FIG. 2 shows the steps involved in the operation of the process of the invention. At box 500 is shown the start of the startup of the burner in high temperature mode. Before the gas is released for the flame, it is checked on a safety monitor as shown in box 510 if one of the following conditions was present before starting the burner:

Device was switched off

The burner has been purged

The cooling operation was present

If one of those conditions is underway, then the burner flame is operated as shown in box 520 which continues for a period of time, such as 0 to 250 seconds as shown in box 530 where the flame operation period is checked to have finished. Box 530 checks whether the time has already elapsed; if not, the burner remains in flame operation (box 520). If yes, it switches to flameless operation according to box 540. If none of the conditions is present in box 510, then flameless operation takes place as the next step in box 540 followed by the end of flameless operation in step 560.

FIG. 2 illustrates an example device 300 for detecting a safe point to start up according to this disclosure. The device 300 could, for example, denote any of the controllers, operator stations, or other devices in or used in conjunction with the system 100 in FIG. 1. The device 300 could also represent the computing device that implements part or all of the control approach in FIG. 2. However, the device 300 could be used in any other suitable system.

Figure 3:
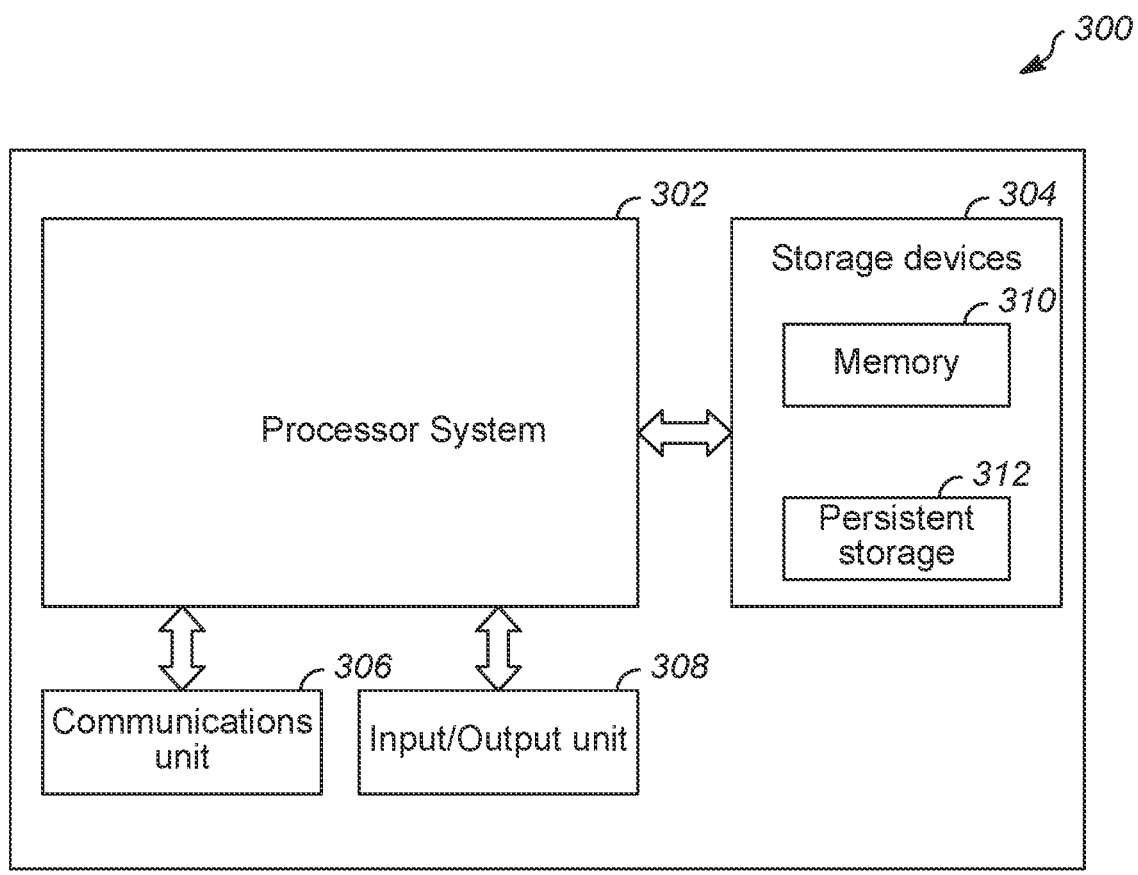
FIG. 3 shows steps in the processing of data.

As shown in FIG. 3, the device 300 includes at least one processor system 302, at least one storage device 304, at least one communications unit 306, and at least one input/output (I/O) unit 308. Each processor system 302 can execute instructions, such as those that may be loaded into a memory 310. The instructions could implement the safe point functionality described herein. Each processor system 302 denotes any suitable processing device, such as one or more microprocessors, microcontrollers, digital signal processors, application specific integrated circuits (ASICs), field programmable gate arrays (FPGAs), or discrete circuitry.

The memory 310 and a persistent storage 312 are examples of storage devices 304, which represent any structure(s) capable of storing and facilitating retrieval of information (such as data, program code, and/or other suitable information on a temporary or permanent basis). The memory 310 may represent a random-access memory or any other suitable volatile or non-volatile storage device(s). The persistent storage 312 may contain one or more components or devices supporting longer-term storage of data, such as a read only memory, hard drive, EEPROM, Flash memory, or optical disc.

The communications unit 306 supports communications with other systems or devices. For example, the communications unit 306 could include a network interface card or a wireless transceiver facilitating communications over a wired or wireless network. The communications unit 306 may support communications through any suitable physical or wireless communication link(s).

The I/O unit 308 allows for input and output of data. For example, the I/O unit 308 may provide a connection for user input through a keyboard, mouse, keypad, touchscreen, or other suitable input device. The I/O unit 308 may also send output to a display, printer, or other suitable output device.

As explained above, after a cooling process, the burner must first be brought above the ignition temperature. The calculation of the time required to reheat the radiant heating tube can be done for either SI units or imperial units as explained in the following Example

EXAMPLE

For SI Units,
T=required minimum heating time for reheating by flame in seconds
D=diameter of the radiant tube in mm
L=heated length of the radiant tube in mm
P=gas connection capacity of the burner in kW
$T/s=0.0037 \times D/mm \times L/mm/(P/kW)$
In an example where the radiant tube has D=200 mm, L=2000 mm, P=40 kW
$T/s=0.0037 \times 200 \times 2000/40=37$
reheating time=37 seconds
For Imperial Units:
T=required minimum heating time for reheating by flame in seconds
D=diameter of the radiant tube in inch
L=heated length of the radiant tube in inch
P=gas connection capacity of the burner in BTU/hr
$T/s=9000 \times D/inch \times L/inch/P/(BTU/hr))$ Example Radiant tube with D=7.9 inch, L=78.7 inch, P=151000 BTU/hr
$T/s=9000 \times 7.9 \times 78.7/151000=37$
reheating time=37 seconds In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer or controller, such as read only memory (ROM), random access memory (RAM), a hard disk drive, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims

The invention claimed is:

1. A furnace heating device, for heating a furnace chamber, comprising:
at least one radiant tube configured to heat said furnace chamber, wherein said at least one radiant tube is heated using a burner, and wherein said burner is operable in a first operating mode with a flame and in a second operating mode with flameless combustion; and
a burner control device configured to control on and off states and operating mode setting for said burner of said at least one radiant tube,
wherein said burner control device is further configured to:
send a signal to prevent start of said flameless combustion for a time period, when it is determined that one of a cooling process, a purging process, and a control device switch on procedure has occurred, wherein the at least one radiant tube has a temperature less than a threshold temperature after the occurrence of the cooling process, the purging process and the control device switch on procedure.

2. The furnace heating device of claim 1 wherein said burner control device is further configured with information on sizes of radiant tubes and burner capacity within said furnace chamber.

3. The furnace heating device of claim 1 comprising a plurality of zones, wherein each zone includes at least one single safety monitor.

4. The furnace heating device of claim 3, wherein a group of said radiant tubes are monitored by said at least one single safety monitor.

5. The furnace heating device of claim 1, further comprising:
a sensor coupled to the burner control device, wherein the sensor is configured to determine the temperature in the at least one radiant tube.

* * * * *